(12) United States Patent
Krob

(10) Patent No.: US 12,417,451 B2
(45) Date of Patent: *Sep. 16, 2025

(54) AUTHENTICATION METHOD SECURED BY STRUCTURAL DECOUPLING OF PERSONAL AND SERVICE IDENTIFIERS

(71) Applicant: A3BC GROUP, Paris (FR)

(72) Inventor: Daniel Krob, Paris (FR)

(73) Assignee: A3BC Group, Paris (FR)

( * ) Notice: Subject to any disclaimer, the term of this patent is extended or adjusted under 35 U.S.C. 154(b) by 55 days.

This patent is subject to a terminal disclaimer.

(21) Appl. No.: 18/035,848

(22) PCT Filed: Nov. 9, 2021

(86) PCT No.: PCT/FR2021/051984
§ 371 (c)(1),
(2) Date: May 8, 2023

(87) PCT Pub. No.: WO2022/096841
PCT Pub. Date: May 12, 2022

(65) Prior Publication Data
US 2023/0410098 A1    Dec. 21, 2023

(30) Foreign Application Priority Data
Nov. 9, 2020 (FR) ...................... 2011468

(51) Int. Cl.
*G06Q 20/38* (2012.01)
*G06Q 20/40* (2012.01)
(52) U.S. Cl.
CPC ..... *G06Q 20/3829* (2013.01); *G06Q 20/3823* (2013.01); *G06Q 20/4014* (2013.01)
(58) Field of Classification Search
None
See application file for complete search history.

(56) References Cited

U.S. PATENT DOCUMENTS 5,764,789 A    6/1998   Pare, Jr. et al.
6,154,879 A   11/2000   Pare, Jr. et al.
(Continued)

FOREIGN PATENT DOCUMENTS

EP   1488359 A4   12/2004
EP   2839603 B1    2/2015
(Continued)

OTHER PUBLICATIONS

* Elaine Barker. "Recommendation for Key Management: Part 1."(May 2020). Retrieved online Oct. 31, 2024. https://nistpubs.nist.gov/nistpubs/specialpublications/nist.sp.800-57pt1r5.pdf (Year: 2020)*

(Continued)

*Primary Examiner* — James A Reagan
(74) *Attorney, Agent, or Firm* — Harness, Dickey & Pierce, PLC

(57) ABSTRACT

A method for enabling secure transactions without the physical support of a security identifier and, in particular, without a token, consisting in recording on a first computer device B a unique digital identifier IDi associated with a unique user Ui, the profile IDi being associated with at least one service identifier IDsi associated with a service Si registered on a second computer device S which is different from the first computer device B, the service Si being accessible by the user Ui, and, during a transaction, acquiring the digital identifier IDi of a user Ui, transmitting it to the first computer device B for comparison with the registered ID identifiers and searching for and activating on the computer device S, at least one service associated with the identifier of the user Ui. The new user registration step includes: when a central computer device receives a profile Pi, executing a step for generating a temporary random master key X; and when the central computer device (Continued)

receives an identifier IDi, executing a step of searching for the pair (IDi, IDRx) on the first computer device B and applying the inverse function FR-1 to the identifier IDRx to determine the key X.

3 Claims, 5 Drawing Sheets

(56) References Cited

U.S. PATENT DOCUMENTS

| | | | | |
|---|---|---|---|---|
| 7,027,408 | B2* | 4/2006 | Nabkel | H04L 41/50 |
| | | | | 370/252 |
| 7,054,845 | B2* | 5/2006 | Oshima | G06Q 20/3829 |
| | | | | 705/64 |
| 7,415,614 | B2* | 8/2008 | Guillou | H04L 9/3247 |
| | | | | 380/278 |
| 8,219,134 | B2* | 7/2012 | Maharajh | G06Q 30/0267 |
| | | | | 455/66.1 |
| 9,124,650 | B2* | 9/2015 | Maharajh | G06Q 50/60 |
| 9,141,823 | B2* | 9/2015 | Dawson | H04L 9/00 |
| 9,729,925 | B2* | 8/2017 | Kannan | H04N 21/252 |
| 10,499,107 | B1* | 12/2019 | Baig | G06V 40/67 |
| 11,070,943 | B2* | 7/2021 | Brown | G06V 40/16 |
| 11,144,915 | B2* | 10/2021 | Osborn | G06Q 20/353 |
| 11,178,143 | B2* | 11/2021 | Xu | H04W 12/0431 |
| 11,589,094 | B2* | 2/2023 | Choudhari | H04N 21/4668 |
| 11,824,643 | B2* | 11/2023 | Choyi | H04L 63/0435 |
| 2002/0049662 | A1* | 4/2002 | Oshima | G06Q 20/26 |
| | | | | 705/37 |
| 2002/0167935 | A1* | 11/2002 | Nabkel | H04L 41/50 |
| | | | | 370/402 |
| 2002/0196741 | A1* | 12/2002 | Jaramillo | H04L 51/18 |
| | | | | 370/465 |
| 2003/0158960 | A1* | 8/2003 | Engberg | G06Q 30/06 |
| | | | | 709/228 |
| 2004/0133781 | A1* | 7/2004 | Guillou | H04L 9/3218 |
| | | | | 713/170 |
| 2006/0212407 | A1* | 9/2006 | Lyon | G06Q 20/4014 |
| | | | | 705/71 |
| 2007/0106892 | A1* | 5/2007 | Engberg | H04L 9/0825 |
| | | | | 713/168 |
| 2008/0195664 | A1* | 8/2008 | Maharajh | G06F 16/487 |
| 2009/0281949 | A1* | 11/2009 | Coppinger | G06Q 20/02 |
| | | | | 705/50 |
| 2009/0282260 | A1* | 11/2009 | Tattan | G06Q 20/3829 |
| | | | | 713/186 |
| 2011/0161233 | A1* | 6/2011 | Tieken | G06Q 20/40 |
| | | | | 705/76 |
| 2011/0225417 | A1* | 9/2011 | Maharajh | H04L 65/752 |
| | | | | 713/150 |
| 2013/0212666 | A1* | 8/2013 | Mattsson | G06Q 20/385 |
| | | | | 726/9 |
| 2014/0304505 | A1* | 10/2014 | Dawson | G06F 21/6227 |
| | | | | 713/165 |
| 2017/0017957 | A1* | 1/2017 | Radu | G06Q 20/4012 |
| 2017/0064390 | A1* | 3/2017 | Kannan | H04N 21/466 |
| 2019/0220852 | A1* | 7/2019 | Black | G06Q 20/38215 |
| 2020/0084575 | A1* | 3/2020 | Brown | H04W 4/023 |
| 2020/0143382 | A1 | 5/2020 | Krob | |

FOREIGN PATENT DOCUMENTS

| | | | | |
|---|---|---|---|---|
| FR | 3033205 A1 | 9/2016 | | |
| WO | WO-2001/027723 A1 | 4/2001 | | |
| WO | WO-2006/0111205 A1 | 10/2006 | | |
| WO | WO-2011041916 A1 * | 4/2011 | | H04W 12/02 |
| WO | WO-2018038384 A1 * | 4/2011 | | H04N 21/25 |
| WO | WO-2018177143 A1 * | 10/2018 | | H04L 12/28 |

OTHER PUBLICATIONS

• PingIdentity. "Cryptographic Keys."(Aug, 12, 2020). Retrieved online Oct 31, 2024. https://backstage.forgerock.com/docs/ds/7.1/security-guide/pki.html (Year: 2020)*
• Oasis. "Key Management Interoperability Protocol Specification Version 1.3." (Dec. 27, 2016). Retrieved online Oct. 31, 2024. https://docs.oasis-open.org/kmip/spec/v1.3/kmip-spec-v1.3.html (Year: 2016)*
U.S. Appl. No. 15/553,728, filed Aug. 25, 2017, Daniel Krob.
Jiang, Peng et al., "An anonymous and efficient remote biometrics user authentication scheme in a multi server environment," Frontiers of Computer Science, Springer Berlin Heidelberg, Berlin/Heidelberg, vol. 9, No. 1, Dec. 29, 2014, pp. 142-156.
International Search Report for International Patent Application No. PCT/FR2021/051984, dated Feb. 9, 2022 (in French and English).

* cited by examiner

AUTHENTICATION METHOD SECURED BY STRUCTURAL DECOUPLING OF PERSONAL AND SERVICE IDENTIFIERS

CROSS-REFERENCE TO RELATED APPLICATIONS

This application is a U.S. national phase entry of PCT Patent Application Serial No. PCT/FR2021/051984, filed on Nov. 9, 2021, which claims priority to French Patent Application Serial No. FR2011468, filed on Nov. 9, 2020, both of which are incorporated by reference herein.

TECHNICAL FIELD

The present invention relates to the field of authenticating a user carrying out electronic transactions using a terminal connected to a computer device or to an access to a physical system. The security of transactions constitutes an essential issue and has given rise to numerous solutions making it possible to limit the risks of fraud as regards the author of the transaction or the nature of the transaction.

Biometric recognition techniques based on imaging systems coupled with a central database storing personal information constitute a path that faces detrimental limitations. Indeed, the biometric data may vary slightly. In order to take these variations into account, it has been provided to retain only a small part of the points considered as invariant. However, this results in:

- The risk of false positives, i.e., the validation of biometric data whose invariant points are indeed identical or similar, but which actually come from two different persons. This has led to a person being arrested on the basis of fingerprints that were unusually close to those of an alleged murderer. This is also the case for the presentation of a fingerprint cast.
- The risk of false negatives, i.e., the absence of validation of biometric data from a person, whose certain invariant points were masked, or modified by an artifact, for example the wearing of a mask.

The invention thus relates to the field of authentication excluding biometric data, and more specifically the field of electronic transactions activated by means of a reliable unique identifier such as for example a QrCode, an alpha-numeric identifier, an email address, a unique identification number such as an IBAN or a social security number, and securing the process of registering the identifier, its storage and verification to reduce the risks in the event of computer attacks on a transaction system server.

BACKGROUND AND SUMMARY

The European patent application EP 1488359A4 is known, which relates to a method making it possible to perform an online transaction via a transaction manager. The method disclosed in the invention consists in generating a one-time use transaction request identification; the transaction manager linking this identification to banking information of a subscribed user; providing the transaction request identification to the subscribed user who makes a request to purchase a product or service having a certain value from a merchant. The purchase request consists in providing the transaction request identification to the merchant. The merchant sends a payment request to the transaction manager for a transfer of funds equal to the value from the user to the merchant, with the payment request comprising the transaction request identification and the value. The transaction manager verifies the validity of the transaction request identification, and then disables the reuse of this identification. If the transaction request identification is valid, an electronic funds transfer request is sent to a financial institution to enable the transfer of the collected value from the user to the merchant, with the electronic funds transfer request comprising the banking information.

European patent EP2839603B1 discloses a user authentication method comprising executing, by a processing system, the following operations:

- receiving a request from a user to initiate an authentication session, the request comprising a unique identifier of the user,
- accessing, by means of the unique identifier, to a registration memorized in a memory associated with the user, the memorized registration comprising at least code value complexity preference data that defines a user-preferred level of complexity intended for a user in validating a user input received in response to the presentation of security matrices, and a user-defined keyword consisting of an ordered sequence of symbols comprising members of a predetermined set of symbols selected from one or more sets of symbols supported by the processing system, wherein the symbols of the ordered sequence have been previously selected by the user independently of other user selections,
- generating a one-time use security matrix that is valid only for the user during the authentication session, and that comprises a matching between each symbol within the set of predetermined symbols and a code value that is specific to the authentication session and randomly selected from a set of codes that is different from the set of predetermined symbols,
- transmitting the one-time use security matrix for presentation purposes to the user, wherein the one-time use security matrix presented to the user comprises symbols from the set of predetermined symbols matching the code values randomly selected from the set of codes,
- receiving an ordered sequence of code values selected from the one-time use security matrix and inputted by the user, based on the user-defined keyword and code value complexity preference data, in response to the presentation of the one-time use security matrix,
- validating the received ordered sequence of code values by comparing it to a matching sequence of code values generated, but not transmitted, by the processing system based on the user-defined keyword in the memorized registration, the code value complexity preference data and the one-time use security matrix, and
- generating an authentication result of the authentication session based on the comparison.

Disadvantages

Background art solutions have a major technical problem because they leave open the possibilities of computer attacks. One of the sources of vulnerability lies in the management of identifiers. The knowledge of the identifier makes it possible to pass a first step of the authorization procedure to a service, the information being used for the following step which is the authentication of the user having transmitted—legally or fraudulently—a valid identifier. The security of the identifier depends on the measures taken by the user in order to preserve the secret character thereof, and where applicable on the electronic means provided on the physical medium of the identifier when it is recorded on a key, a card or a portable device such as a telephone.

The solutions of the background art have a second disadvantage that concerns the security of the authentic data recorded during the creation of a user's account. This data is generally recorded in a secured area DMZ of the computer device, but in the event of a computer attack, it is still possible to recover all of the data associated with the users' identifiers.

A third disadvantage lies in the risk of data interception and fraudulent reuse of this data. A fourth disadvantage lies in the risk of creating a false account for accessing the services of a third-party user. It is implicitly accepted that the identification is vulnerable and requires only little computation power on the user's device, insofar as security will result from be the robustness of the authentication and optionally certification protocol, requiring more powerful processing resources, pooled at the level of a computer device.

Solution

In order to remedy these disadvantages, the invention relates according to its most general meaning, to a method for enabling secure transactions of a security identifier and, in particular, without a token, consisting in recording on a first computer device B a unique digital identifier $ID_i$ associated with a unique user $U_i$, said profile $ID_i$ being associated with at least one service identifier IDsi associated with a service Si registered on a second computer device S which is different from the first computer device B, said service $S_i$ being accessible by the user $U_i$, and, during a transaction, acquiring the digital identifier $ID_i$ of a user $U_i$, transmitting it to the first computer device B for comparison with the registered ID identifiers and searching for and activating, on the computer device S, at least one service associated with the identifier of the user $U_i$, characterized, in that the new user registration step includes the following steps:

when a central computer device receives an identifier $ID_i$ and a service identifier IDsi, executing a step of generating a master key, characterized in that said master key is a temporary random key X, then a step of generating a reference identifier IDRx, calculated by applying a non-reversible reference cryptographic function FR to said key, and of recording in a computer table the unique pair ($ID_i$, IDRx) recorded on the computer device B, and lastly a step of generating at least one reference identifier IDSEx, calculated by applying a non-reversible reference cryptographic function FSE different from function FR, to said temporary random key, and of recording in a computer table the unique pair ($ID_{si}$, IDSEx) recorded on a computer device S, in that the accomplishment of a transaction includes the following steps:

when said central computer device receives an identifier $ID_i$, executing a step of searching for the pair ($ID_i$, IDRx) on said first computer device B and applying the inverse function FR-1 to the identifier IDRx to determine the temporary random key, and lastly the search for at least one service $S_i$ on a second computer device S by applying the function FSE to said temporary random key, in order to calculate the identifier IDSEx and obtain the identifier $ID_{si}$ associated with the service $S_i$.

Advantageously, it further includes, when a central computer device receives an identifier $ID_i$, a step of generating a reference identifier IDPEx calculated by the application of a non-reversible cryptographic function FPE, different from the reference functions FR and FSE, to said random key X and of recording in a computer table the pair ($ID_{pi}$, IDPEx), wherein $ID_{pi}$ is an identifier of personal information Pi associated with the user $U_i$ and accessible to the latter, stored on a third computer device P different from said first and second computer devices B and S, and when the transaction is being accomplished, the search for the personal information $P_i$ on said third computer device P by applying the function FPE to said temporary random key, in order to calculate the identifier IDPEx and obtain the identifier $IP_{pi}$ associated with the personal information $P_i$.

The invention also relates to a set of computer devices for accomplishing secure transactions of a security identifier without a token, characterized in that said set of computer devices comprises a computer device making it possible to access a first computer device B and at least one second service computer device S, and a computer key device forming the support of said non-reversible functions. Preferably, the set further includes computer processing computer devices for accomplishing control, security and plausibility processing of information coming from user devices. The invention also includes a computer program for controlling the execution on a computer device the accomplishment of a secure transaction of a security identifier, without a token, characterized in that it consists of a code controlling the acquisition of a digital identifier coming from remote devices, the processing of said identifiers in accordance with the aforementioned method and the execution of the data exchange protocol between the remote devices and the computer device for the use thereof.

BRIEF DESCRIPTION OF THE DRAWINGS

The invention will be better understood on reading the following description, with reference to the appended drawings, in which.

DETAILED DESCRIPTION

Hardware Architecture

Figure 1:
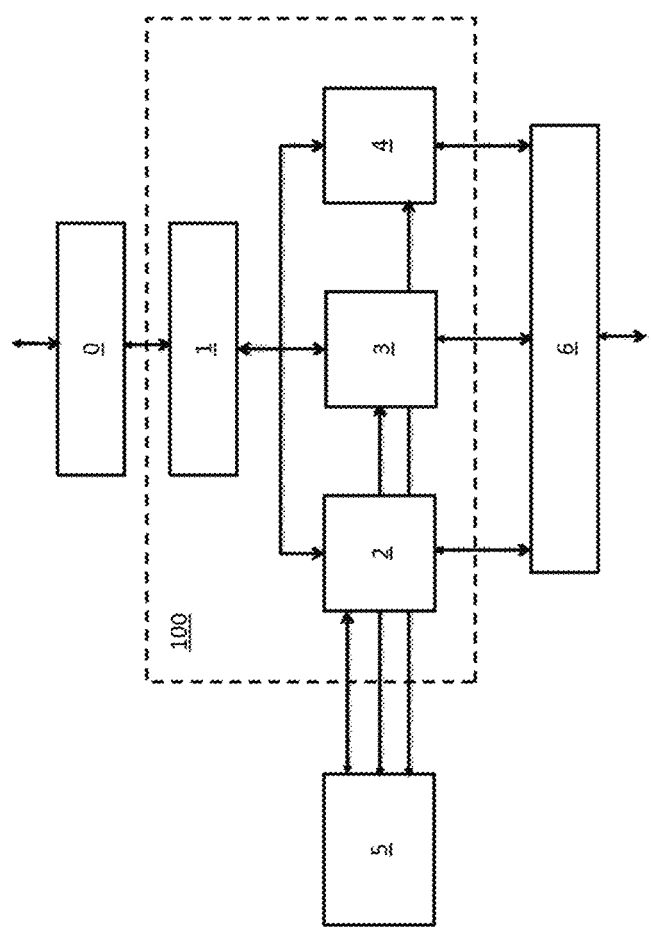
FIG. 1 depicts the hardware architecture of a computer device for the implementation of the invention.

FIG. 1 depicts a schematic diagram of the hardware architecture of a system for the implementation of the invention. The user has a unique identifier that can simply be memorized, or recorded on a peripheral device in the possession of the user and that is transferable to a control terminal by entering it on a keyboard or a touch screen, or by transmitting it from a memory via a physical link such as a connector or an optical link or by radio frequency.

The input and output computer device (0) receives the information flows from user devices, manages the queues, for the on-the-fly distribution on the processing computer device (1) and the returns to the input terminals or the transmission device of the identifier. This input and output device (0) also accomplishes control, security and plausibility processing, as well as transmission operations in order to verify that the transmitted information is indeed compliant. This involves especially checking whether the identifier of the terminal or the device transmitting the identifier (for example its IP address) is on a blacklisted terminal, or if the information has anomalies representative of attempted attacks, saturation or fraud.

The computer device (0) opens a transactional session to interact with the device (1) giving access to the devices (2 to 4) in order to obtain user profiles, services and personal information and retroact with the device (0) in order to exchange with the involved user via a transactional session managed in synchronous or asynchronous mode. Regarding the computer devices (2 to 4), they manage the consolidated access to the user profiles, services and personal information, by interacting with a computer key device (5) forming the support for the non-reversible functions implemented by the method according to the invention. The computer device (6) makes it possible to administer the entire system especially by keeping the trace of all transactions, in order to allow the audit of the transactions and in the event of a physical crash, the restoration of the transactions.

Functional Diagram of the Invention

Figure 2:
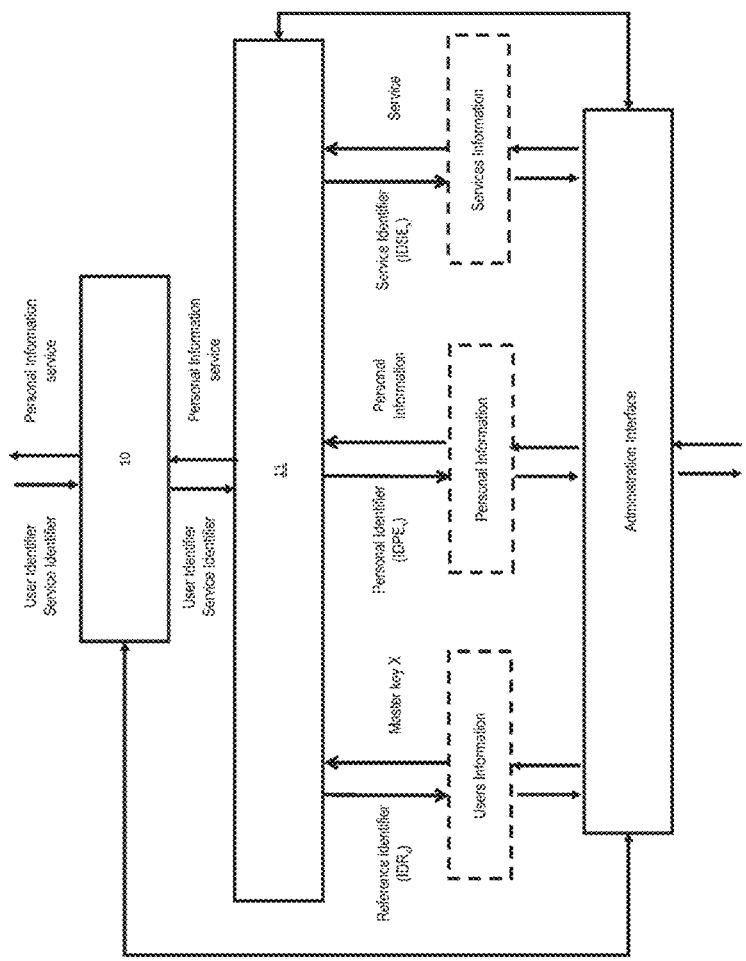
FIG. 2 depicts the block diagram of the invention.
Figure 3:
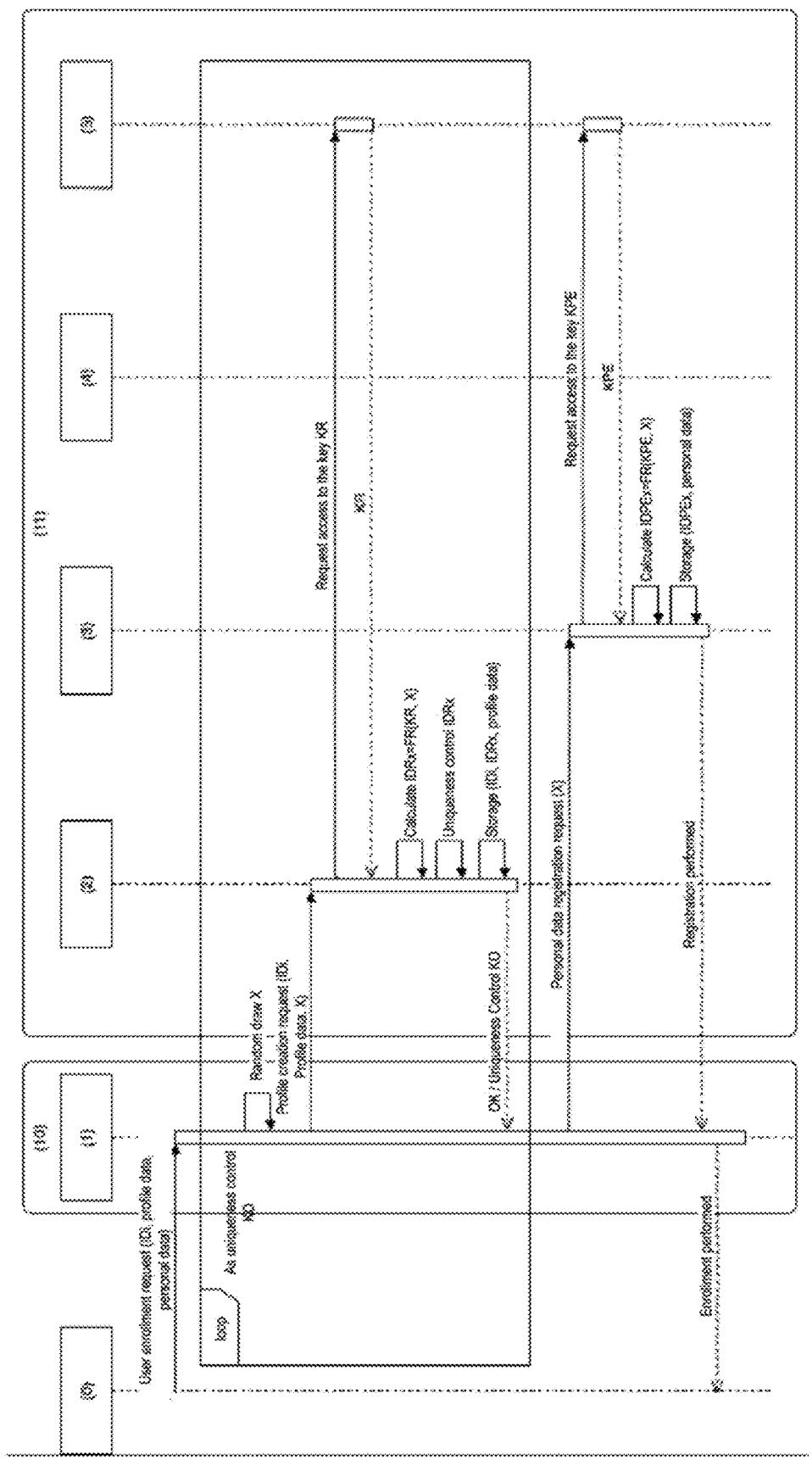
FIG. 3 depicts the data exchanges diagram for the procedure for a new user enrollment.
Figure 4:
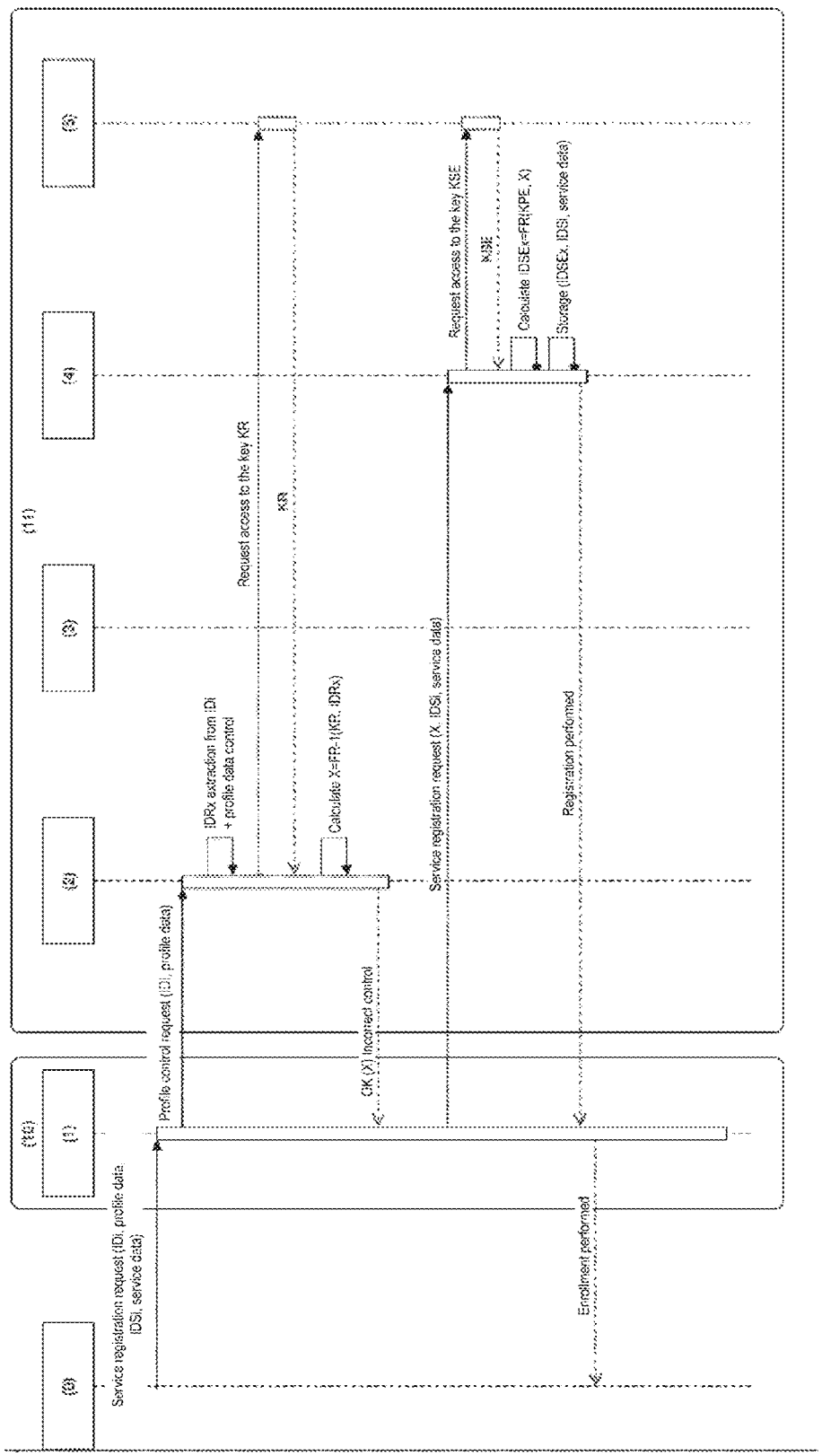
FIG. 4 depicts the data exchanges diagram for the procedure for enrolling a user to a new service.
Figure 5:
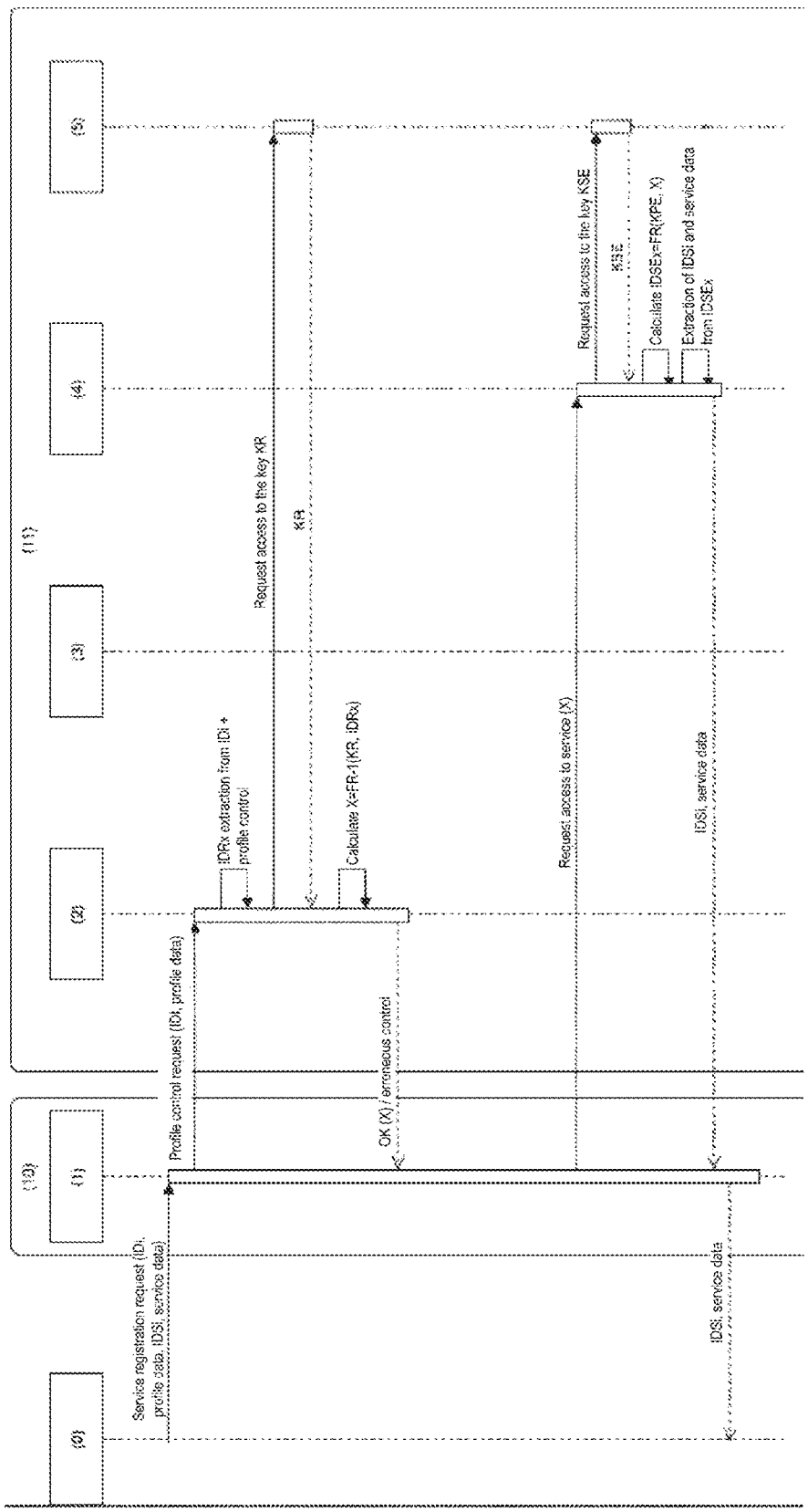
FIG. 5 depicts the data exchanges diagram for the procedure to access a service by an enrolled user.

FIG. 2 depicts an example of a functional diagram, FIGS. 3 to 5 showing in more detail the information exchanges between the different computing resources implemented, respectively the procedure for a new user enrollment, the procedure for enrolling an enrolled user to a new service, and the procedure for requesting access to a service by an enrolled user.

New User Enrollment Procedure

The new user first proceeds to an enrollment via a computer device (0) as illustrated in FIG. 3. He or she opens a session with the computer device (1) and transmits a digital file matching an enrollment request. This file contains an identifier, profile data, and personal data. It can be transmitted in an encrypted form.

The client accesses the service by means of a computer device (0), which comprises means for inputting or transmitting an identifier, for example a keyboard, a QrCode reader, a radiofrequency module, a connector to receive a peripheral device for recording the identifier or an application in charge of transmitting the identifier. This device (0) is connected to a network for opening a session with the system (100) which hosts the set of computer devices constituting the hardware architecture of the invention.

The first function (10) consists in retrieving, controlling and transmitting the information necessary for the transaction, in particular the digital identifier acquired by the computer device (0) as well as associated information (for example the geolocation of the terminal, the identifiers of the terminal or the application in charge of transmitting the identifier (IP address, different identifiers such as SIM card, etc.) or the time stamp), as well as information only on the nature of the transaction. This information comes from the identifier of the provider/terminal pair, for example when it is a terminal of a provider made available to users, or the identification of the service access application. The function (10) also opens a transactional session for each user.

Procedure for Enrolling a User to a New Service

The enrolled user, as explained previously, then proceeds to enroll to services via his or her computer device (0) as illustrated by FIG. 4. He or she opens a session with the computer device (1) and transmits a digital file matching a service registration request. This file contains a service identifier, profile data, and personal data. It can be transmitted in an encrypted form.

This process (11) is integrated in a processing chain linked to a transactional session opened for each user by the function (10). For this purpose, each transactional session consists in transmitting, controlling and reconciling the user profiles, the service identifiers and the personal information provided by the function (11), and then obtaining the service selected by the client. This processing (11) is accomplished by the computer device (1), by interacting with the computer devices (2 to 4) and (5). The system (100) also integrates administration functions and functions in charge of the traceability and security protocols.

Procedure for Requesting the Access of a User to a Service

The enrolled user, as explained previously, can then proceed to request access to previously enrolled services as illustrated by FIG. 5. He or she opens a session with the computer device (1) and transmits a digital file matching a request to access the service. This file contains an identifier and profile data. It can be transmitted in an encrypted form.

This request is verified by the device (1) to verify whether the user is actually enrolled, and if the requested service is enrolled. If this is the case, it transmits the access request to the computer device (2) matching the requested service. This device (2) proceeds to extract the identifier IDRx from the identifier ID and executes a control of the profile recorded in the request. In the event of an erroneous control, the task stops by means of an interruption procedure and optionally a notification to the device (1) which transmits it to the user device (0). If the control is positive, the involved computer device (2) opens a session with the computer device (5) in order to obtain the public key KR and then proceeds to calculate the source value X from a decryption function $F^{-1}$ (KV,Y) as explained in more detail below. This source value thus calculated is controlled by device 2 and transmitted to the device (1).

The device then proceeds to making a request to access the service (X) through a session with the device (4), which opens a session with the device (5) in order to transmit a request to access the key KSE. This key KSE is transmitted in response to the device (5), which then proceeds to calculate $IDSE_x$=FR (KPE, X). From this information, the device (5) extracts the identifier $IDS_i$ and the service data to transmit them to the device (1) which transmits them via the initially opened session to the user device (0).

Protocols for the Creation of Identifiers and Identification

The following description presents in more detail the protocol for the creation of the identifiers, and then in the following part, the protocol for identification from a digital identifier presented to the system. One of the important goals of the invention is to guarantee data security natively integrated ("by design") in its architecture due to the fact that the reference identifier of the digital identifier and the reference identifiers of the services are structurally different, their generation being managed by an algorithm based on a one-way cryptographic function so as to be able to perform reconciliations on-the-fly according to transactional needs. The proposed mechanism is based on the use of cryptographic protocols such as AES with keys of size greater than 128 bits, for example RSA with a 2048 bit key.

The operator of the system must select one-way cryptographic functions F for managing its exchanges with the information storage sources used. They will be called hereafter FR (for the reference function), FSE (for the access, storage and update of service information) and FP (for the access, storage and update of personal information). These functions will allow the computer devices (2 to 4) to calculate in real time values Y=F(KQ,X) as a function of a source value X and using a public key KQ so that the knowledge of Y does not make it possible to automatically go back to X in an algorithmically realistic way (the reconstruction times of the source value X must be prohibitive in practice). To go back to X, it must be necessary to have a private key KV held secret, which makes it possible to reconstruct $X=F^{-1}(KV,Y)$ from Y by using a decryption function $F^{-1}$.

The generation of reference identifiers, service identifiers and personal identifiers of a user $U_i$ will then be done according to the following protocol: The computer device (1) randomly draws a random value X for example using a hash function to statistically avoid collisions. The computer devices (2 to 4) interact with the computer device (5) to obtain the public keys KR, KPE and KSE to manage respectively the exchanges involving the identification information, the services and the personal information.

The computer devices (2 to 5) fabricate the reference identifier IDR and at least one service identifier IDSE, as well as a personal information identifier IDPE, where appropriate, according to the following simple rules (in the event of collision with an existing identifier, a new value X will be generated):

$$IDR=FR(KR,X),$$

$$IDPE=FPE(KPE,X)$$

$$IDSE=FSE(KSE,X).$$

In this way, the identifiers are indeed linked through X, which makes it possible to reconstitute an identifier from the reference identifier using the private cryptographic key that allows the decryption of the reference identifier and thus to reconstitute the random value X from their knowledge. The client services and the personal information, where appropriate, belonging to a given physical person, recognized by means of his or her digital identifier, will thus be reconstituted.

The invention claimed is:

1. An authentication method for a secure transaction of a security identifier, without a token, including a new user registration step comprising:
   recording on a first computer a profile associated with a single user, the profile being associated with at least one service identifier associated with a service, registered on a second computer different from the first computer, the service being accessible by the user,
   when a central computer receives an identifier and a service identifier, executing a step of generating a master key,
   and, during a transaction, proceeding with a step of opening a session on a network comprising the first computer and a host system which hosts a set of computers comprising giving access to the computers in order to obtain the user profiles, services and personal information and retroact with the computers as well as a computer key interacting with the computers to provide public keys and to manage respectively exchanges involving the identification information, the services and the personal information;
   retrieving, controlling and transmitting the information necessary for the transaction, including the digital identifier acquired by the first computer as well as the associated information,
   transmitting, controlling and reconciling the user profiles, the service identifiers and the personal information provided by a function, and then obtaining the service selected by a client by proceeding with the acquisition of the profile of the user to transmit it to the first computer for comparison with the recorded identifiers and to search for and activate, on the computers, at least one service associated with the user identifier,
   the new user registration step comprising:
   when the central computer receives an identifier and a service identifier, executing the step of generating the master key,
   wherein the master key is a temporary random key,
   then generating a reference identifier, calculated by applying a non-reversible reference cryptographic function to the temporary random key, and recording in a computer table the unique pair of the identifiers (IDi, IDRx) recorded on the computer, and
   generating at least one service identifier, calculated by applying a non-reversible reference cryptographic function different from the function, to the temporary random key, and recording in a computer table the unique pair of the identifiers recorded on the computers.

2. The authentication method for a secure transaction of a security identifier according to claim 1, further comprising, when the central computer receives an identifier, generating a reference identifier calculated by a non-reversible cryptographic function, different from the reference functions, to the random key and recording in a computer table the identification pair, wherein an identifier of personal information associated with the user and accessible to the latter, is stored on a third computer different from the first and second computers, and when the transaction is being accomplished, the search for the personal information on the third computer by applying the function to the key, in order to calculate the identifier and obtain the identifier associated with the personal information.

3. A set of computer devices for accomplishing secure transactions of a security identifier without a token, wherein the set of computer devices comprises:
   (a) input computers configured to receive information flows coming from user terminals, executing and finalizing the transactions new user registration instructions comprising:
      when a central of the computers receives an identifier and a service identifier, generating a master key which is a temporary random key,
      then, generating a reference identifier calculated by applying a non-reversible reference cryptographic function to the temporary random key, and recording in a computer table unique identifiers recorded on one of the computers,
      thereafter, generating at least one service identifier, calculated by applying a non-reversible reference cryptographic function different from the function, to the temporary random key, and recording the unique identifiers recorded on the computers; and
   (b) the computers comprising a third computer interfacing to a first computer and to at least a second service computer, and the computers forming support of the non-reversible functions.

* * * * *